United States Patent
Lee et al.

(10) Patent No.: US 11,150,770 B2
(45) Date of Patent: Oct. 19, 2021

(54) INPUT DEVICE, ELECTRONIC SYSTEM AND CONTROL METHOD THEREFOR

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Hyung-sun Lee, Yongin-si (KR); Kang-yoon Lee, Seoul (KR); Sung-hun Cho, Suwon-si (KR); Gwan-hyung Kim, Suwon-si (KR); Sang-yun Kim, Suwon-si (KR); Ho-chul Ryu, Suwon-si (KR); Sang-ho Kim, Hwaseong-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 16/493,057

(22) PCT Filed: Feb. 7, 2018

(86) PCT No.: PCT/KR2018/001628
§ 371 (c)(1),
(2) Date: Sep. 11, 2019

(87) PCT Pub. No.: WO2018/169209
PCT Pub. Date: Sep. 20, 2018

(65) Prior Publication Data
US 2020/0192523 A1 Jun. 18, 2020

(30) Foreign Application Priority Data
Mar. 16, 2017 (KR) .......................... 10-2017-0033068

(51) Int. Cl.
*G06F 3/044* (2006.01)
*G06F 3/038* (2013.01)
*G06F 3/0354* (2013.01)

(52) U.S. Cl.
CPC .......... *G06F 3/0442* (2019.05); *G06F 3/0383* (2013.01); *G06F 3/03545* (2013.01); *G06F 3/0441* (2019.05); *G06F 3/0446* (2019.05)

(58) Field of Classification Search
CPC .. G06F 3/0442; G06F 3/03545; G06F 3/0383; G06F 3/0446; G06F 3/0445;
(Continued)

(56) References Cited

U.S. PATENT DOCUMENTS

| | | | | |
|---|---|---|---|---|
| 5,798,756 A | * | 8/1998 | Yoshida | G06F 3/0412 345/179 |
| 8,638,320 B2 | * | 1/2014 | Harley | G06F 3/0441 345/179 |

(Continued)

FOREIGN PATENT DOCUMENTS

| | | |
|---|---|---|
| CN | 105912147 | 8/2016 |
| CN | 105955515 | 9/2016 |

(Continued)

OTHER PUBLICATIONS

International Search Report and English translation for PCT/KR2018/001628, dated May 3, 2018, 5 pages.
(Continued)

*Primary Examiner* — Julie Anne Watko
(74) *Attorney, Agent, or Firm* — Nixon Vanderhye, P.C.

(57) ABSTRACT

Disclosed is an input device. The input device includes a communicator configured to communicate with an electronic device, a pen tip provided at one end of the input device, a first electrode portion including a plurality of first sub-electrodes spaced apart from each other by a predeter-
(Continued)

mined distance from the pen tip, a second electrode portion including a plurality of second sub-electrodes spaced apart from each other to correspond to each of the plurality of first sub-electrodes at a position spaced apart from the first electrode portion by a predetermined distance, a processor to provide a driving signal to the first electrode portion and the second electrode portion, generate tilt information of the input device on the basis of a plurality of capacitances formed between the plurality of first sub-electrodes and the plurality of second sub-electrodes, and transmit the tilt information to the electronic device.

12 Claims, 10 Drawing Sheets

(58) Field of Classification Search
CPC . G06F 3/044; G06F 3/033; G06F 3/03; G06F 3/017; G06F 3/01; G06F 3/00; G06F 3/036; G06F 3/038; G06F 3/041; G06F 3/0412; G06F 3/0416; G06F 3/04164; G06F 3/04166; G06F 3/04182; G06F 3/0441
See application file for complete search history.

(56) References Cited

U.S. PATENT DOCUMENTS

| | | | |
|---|---|---|---|
| 8,963,889 B2 | 2/2015 | Oda et al. | |
| 9,529,456 B2 | 12/2016 | Oda et al. | |
| 9,606,640 B2 | 3/2017 | Oda et al. | |
| 9,632,599 B2 | 4/2017 | Oda et al. | |
| 10,216,292 B2 | 2/2019 | Munakata et al. | |
| 2008/0252621 A1* | 10/2008 | Shipton | G01L 1/144 345/179 |
| 2012/0327042 A1* | 12/2012 | Harley | G06F 3/03545 345/179 |
| 2013/0106718 A1* | 5/2013 | Sundara-Rajan | G06F 3/038 345/173 |
| 2013/0278550 A1* | 10/2013 | Westhues | G06F 3/0386 345/174 |
| 2015/0293613 A1* | 10/2015 | Johansson | G06F 3/03545 345/174 |
| 2016/0188016 A1* | 6/2016 | Munakata | G06F 3/046 345/179 |
| 2016/0246389 A1* | 8/2016 | Munakata | G06F 3/0383 |
| 2017/0068337 A1* | 3/2017 | Bhandari | G06F 3/0383 |
| 2017/0075441 A1* | 3/2017 | Leigh | G06F 3/0416 |
| 2017/0242502 A1* | 8/2017 | Gray | G06F 3/044 |
| 2018/0364820 A1* | 12/2018 | Wong | G06F 3/0383 |
| 2020/0026383 A1* | 1/2020 | Hwang | G06F 3/04162 |
| 2020/0073490 A1* | 3/2020 | Bell | G06F 3/044 |
| 2020/0159382 A1* | 5/2020 | Drumm | G06F 3/0421 |

FOREIGN PATENT DOCUMENTS

| | | |
|---|---|---|
| JP | 10-11206 | 1/1998 |
| JP | 10-105322 | 4/1998 |
| JP | 2004-070887 | 3/2004 |
| JP | 2011-164801 | 8/2011 |
| JP | 2016-126503 | 7/2016 |
| KR | 10-2016-0094172 | 8/2016 |

OTHER PUBLICATIONS

Written Opinion and English translation of the ISA for PCT/KR2018/001628, dated May 3, 2018, 12 pages.

Office Action dated Feb. 18, 2021 in counterpart Korean Patent Application No. 10-2017-0033068 and English-language translation.

* cited by examiner

INPUT DEVICE, ELECTRONIC SYSTEM AND CONTROL METHOD THEREFOR

This application is the U.S. national phase of International Application No. PCT/KR2018/001628 filed 7 Feb. 2018, which designated the U.S. and claims priority to KR Patent Application No. 10-2017-0033068 filed Mar. 16, 2017, the entire contents of each of which are hereby incorporated by reference.

TECHNICAL FIELD

The disclosure relates to an input device and a controlling method therefor and, more particularly, to an input device in a pen type, an electronic system, and a controlling method therefor.

DESCRIPTION OF RELATED ART

Development in electronic technology has led to development and distribution of various types of electronic devices.

In particular, a smartphone or a tablet PC which a user may portably carry out has been actively distributed. A smartphone or tablet PC includes a touch screen mainly, and a user may control a function of an electronic device using a touch screen.

A user may touch a touch screen by using not only the user's body (for example, fingers, or the like) but also a pen-shaped input device. The electronic device may perform different control operations according to the touch coordinates of the point where the body, the input device, or the like, touch the touch screen and a menu (or icon) displayed on the touch coordinates thereof.

In particular, an electronic device may perform various functions such as adjusting thickness of a writing trajectory based on a degree of tilt of the input device, or the like.

A related-art tilt sensing method senses a tilt value of an input device based on a capacitor value formed between an input device and an electronic device, but there is a problem in that the method is not efficient, as a mutual operation is required between the input device and the electronic device.

SUMMARY

Accordingly, the objective of the disclosure is to provide an input device to detect tilt of the input device based on a change amount of intrinsic capacitance of the input device, an electronic system, and a controlling method therefor.

According to an embodiment, an input device includes a communicator configured to communicate with an electronic device, a pen tip provided at one end of the input device, a first electrode portion including a plurality of first sub-electrodes spaced apart from each other by a predetermined distance from the pen tip, a second electrode portion including a plurality of second sub-electrodes spaced apart from each other to correspond to each of the plurality of first sub-electrodes at a position spaced apart from the first electrode portion by a predetermined distance, a processor to provide a driving signal to the first electrode portion and the second electrode portion, generate tilt information of the input device on the basis of a plurality of capacitances formed between the plurality of first sub-electrodes and the plurality of second sub-electrodes, and transmit the tilt information to the electronic device.

Here, one of the plurality of first sub-electrodes and a corresponding second sub-electrode among the plurality of second sub-electrodes may operate as a first capacitor according to a first driving signal, other of the plurality of first sub-electrodes and a corresponding second sub-electrode among the plurality of second sub-electrodes may operate as a second capacitor according to a second driving signal, and the plurality of capacitances may include capacitance of the first capacitor and capacitance of the second capacitor.

The plurality of first sub-electrodes may be spaced apart from each other by a predetermined distance and disposed to surround the input device, and the plurality of second sub-electrodes may be spaced apart from the first electrode portion by a predetermined distance in a direction opposite to a direction where the pen tip is disposed, and disposed to surround the input device.

The processor may include a driver configured to apply a driving signal to the electrode portion, a plurality of integrators each including a resistor and an amplifier (AMP) connected to the resistor, and input of the AMP may be connected to each of the plurality of first sub-electrodes and output of the AMP may connected to each of the plurality of second sub-electrodes, and the plurality of first sub-electrodes and the plurality of second sub-electrodes may be paired respectively and operate as a capacitor of each of the plurality of integrators.

The processor may obtain capacitance of the plurality of capacitors on the basis of a magnitude of constant current source applied to the plurality of integrators, integration time, and an output voltage value of each of the plurality of integrators.

The processor may generate the tilt information by comparing a plurality of reference capacitances and the plurality of capacitances, and the plurality of reference capacitances may be capacitances formed between the plurality of first sub-electrodes and the plurality of second sub-electrodes, the capacitances being measured in a state where the input device is at a predetermined angle with respect to the electronic device.

The tilt information of the input device may be at least one of information on the plurality of capacitances and a tilt value calculated on the basis of the plurality of capacitances.

The processor may generate rotation information of the input device on the basis of a plurality of capacitances formed between the plurality of first sub-electrodes and the plurality of second sub-electrodes and transmit the rotation information to the electronic device.

According to an embodiment, an electronic system including an electronic device having an input device and a touch screen includes an input device including a pen tip provided at one end of the input device, a first electrode portion including a plurality of first sub-electrodes spaced apart from each other by a predetermined distance from the pen tip, and a second electrode portion including a plurality of second sub-electrodes spaced apart from each other to correspond to each of the plurality of first sub-electrodes at a position spaced apart from the first electrode portion by a predetermined distance from the first electrode portion, and information on a plurality of capacitances formed between the plurality of first sub-electrodes and the plurality of second sub-electrodes may be transmitted to the electronic device, and an electronic device configured to obtain a tilt value of the input device on the basis of information on the plurality of capacitances received from the input device, and control the touch screen on the basis of the obtained tilt value.

According to an embodiment, a controlling method of an input device including a pen tip provided at one end, a first electrode portion including a plurality of first sub-electrodes spaced apart from each other by a predetermined distance from the pen tip, and a second electrode portion including a plurality of second sub-electrodes spaced apart from each other to correspond to each of the plurality of first sub-electrodes at a position spaced apart from the first electrode portion by a predetermined distance from the first electrode portion includes providing a driving signal to the first electrode portion and the second electrode portion, generating tilt information of the input device on the basis of a plurality of capacitances formed between the plurality of first sub-electrodes and the plurality of second sub-electrodes, and transmitting the tilt information to the electronic device.

One of the plurality of first sub-electrodes and a corresponding second sub-electrode among the plurality of second sub-electrodes may operate as a first capacitor according to a first driving signal, other of the plurality of first sub-electrodes and a corresponding second sub-electrode among the plurality of second sub-electrodes may operate as a second capacitor according to a second driving signal.

The plurality of capacitances may include capacitance of the first capacitor and capacitance of the second capacitor.

The plurality of first sub-electrodes may be spaced apart from each other by a predetermined distance and disposed to surround the input device, and the plurality of second sub-electrodes may be spaced apart from the first electrode portion by a predetermined distance in a direction opposite to a direction where the pen tip is disposed, and disposed to surround the input device.

The input device may further include a plurality of integrators each including a resistance and an amplifier (AMP) connected to the resistance, and input of the AMP is connected to each of the plurality of first sub-electrodes and output of the AMP is connected to each of the plurality of second sub-electrodes, and the plurality of first sub-electrodes and the plurality of second sub-electrodes may be paired respectively and operate as a capacitor of each of the plurality of integrators.

The generating tilt information of the input device may include obtaining capacitance of the plurality of capacitors on the basis of a magnitude of constant current source applied to the plurality of integrators, integration time, and an output voltage value of each of the plurality of integrators.

The generating tilt information of the input device may include generating the tilt information by comparing a plurality of reference capacitances and the plurality of capacitances, and the plurality of reference capacitances may be capacitances formed between the plurality of first sub-electrodes and the plurality of second sub-electrodes, the capacitances being measured in a state where the input device is at a predetermined angle with respect to the electronic device.

The tilt information of the input device may be at least one of the plurality of capacitance information and a tilt value calculated based on the plurality of capacitance information.

In addition, the generating rotation information of the input device on the basis of the plurality of capacitances formed between the plurality of first sub-electrodes and the plurality of second sub-electrodes and the transmitting the generating rotation information to the electronic device may be further included.

As described above, according to various embodiments, a tilt may be sensed by recognizing a change of a capacitor value of the input device and accordingly, a design independent of the electronic device is available.

DETAILED DESCRIPTION OF EXAMPLE EMBODIMENTS

Figure 1A:
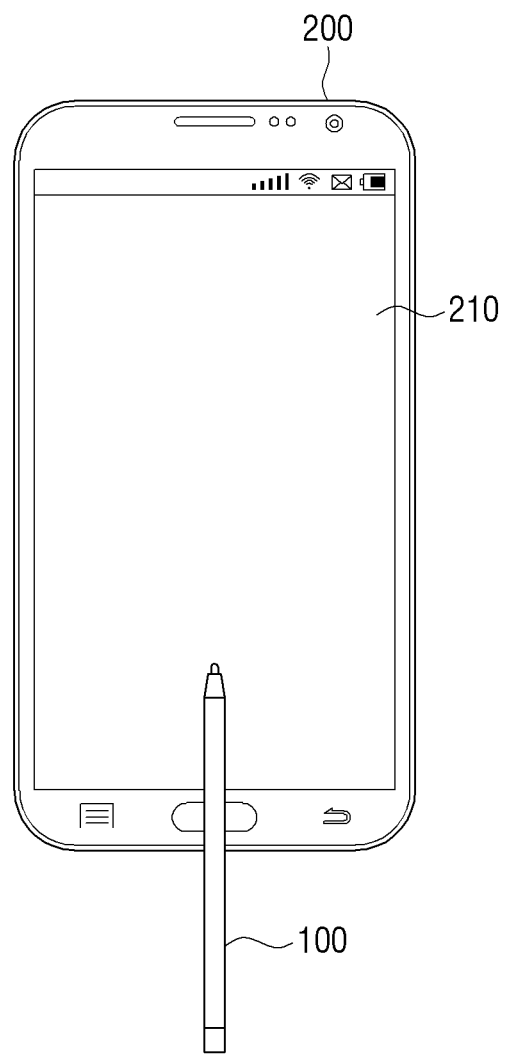
FIGS. 1A and 1B are views to describe a brief operation of an input device and an electronic device according to an embodiment.

Hereinbelow, the disclosure will be described in greater detail with reference to the drawings.

After terms used in the present specification are briefly described, the present disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Since the disclosure may be variously modified and have several embodiments, specific embodiments of the disclosure will be illustrated in the drawings and be described in detail in the detailed description. However, it is to be understood that the disclosure is not limited to specific exemplary embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by the terms. The terms are used only to distinguish one component from another component.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In exemplary embodiments of the present disclosure, a 'module' or a '~er/~or' may perform at least one function or operation, and be implemented by hardware or software or be implemented by a combination of hardware and software.

In addition, a plurality of 'modules' or a plurality of '~ers/~ors' may be integrated in at least one module and be implemented by at least one processor (not illustrated) except for a 'module' or a '~er/or' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure, and similar portions will be denoted by similar reference numerals throughout the specification.

Figure 1B:
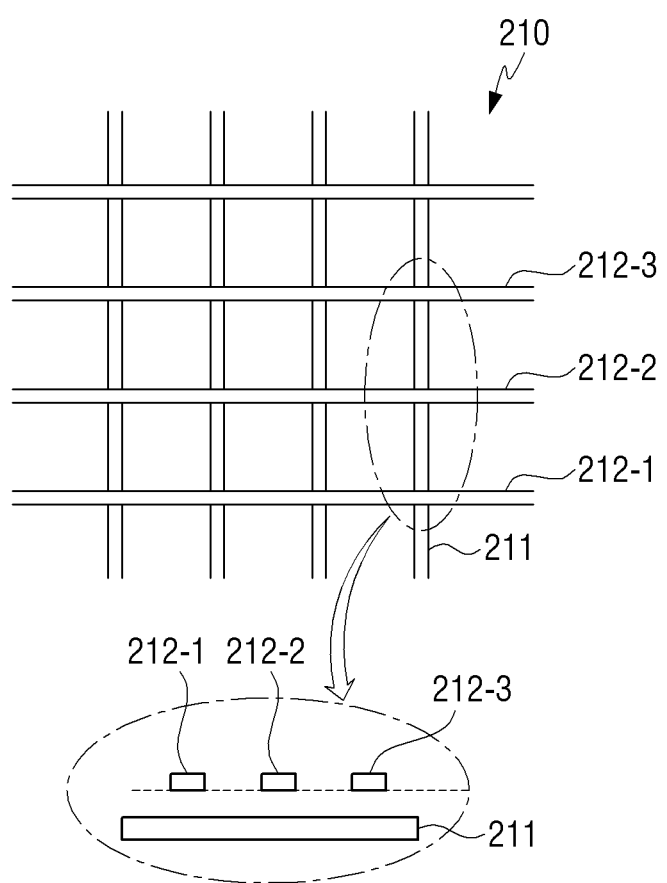

FIGS. 1A and 1B are views to describe a brief operation of an input device and an electronic device according to an embodiment.

Referring to FIG. 1A, an input device 100 according to an embodiment may be implemented as a thin and long pen shape which has a predetermined length and is easy for a user to grip. Accordingly, the input device 100 may be referred to as various terms such as an electronic pen, a pen-type input device, a stylus pen, an S-pen, or the like, but is not necessarily implemented in a pen shape. For example, the input device 100 may be implemented to have a blunt or flat shaped body.

The input device 100 may be implemented as a passive type or an active type.

The passive type is a type to sense a touch input of the input device 100 by a touch panel 210 itself, including a capacitive type, electro magnetic resonance (EMR) type, or the like. When implemented in the capacitive type, the input device 100 includes a conductive tip having a predetermined area, and when implemented in the EMR type, the input device 100 may include a coil for inducing electricity by an external magnetic field signal.

In the active type, a battery is built in the input device 100 to generate an intrinsic signal, a sensor for sensing the input device 100 is added to an electronic device 200, and an operating system terminal of the electronic device 200 recognizes the input device 100. In this case, by distinguishing between the input device 100 and the finger touch or by recognizing the input device 100 by distinguishing each input device 100, various operations are possible using the finger and the pen.

The electronic device 200 may be implemented as an input panel such as a touch panel, a touch screen, or an electronic device such as a notebook including a touch panel or a touch screen, a laptop, a mobile phone, a smart phone, an electronic board, a digital signage, a portable media player (PMP), an MP3 player, a game console, a kiosk, a monitor, or the like.

The capacitive touch panel according to an embodiment may have an electrode pattern structure as shown in FIG. 1B. A grid-shaped electrode pattern illustrated in FIG. 1B includes vertical lines 211 and horizontal lines 212-1, 212-2, and 212-3. The type may be divided into a transmitter for transmitting an electric field and a receiver for detecting a change in the electric field, so that coordinates may be detected by detecting a change in the electric field due to contact of a conductor. To be specific, when the electric field is output from the input device 100 itself, a change of the electric field in the electrode pattern is detected. If it is desired to detect the contact of the finger, a method may be used in which, out of the electrodes in crossing directions, the electrode in the first direction is functioning as a transmitter and the electrode in the second direction is functioning as a receiver.

Meanwhile, the electronic device 200 may perform a different control operation according to the signal output from the input device 100. For example, if the user touches the input device 100 on the touch screen of the electronic device 200 and moves the touch point, the electronic device 200 displays a line, that is, a writing trajectory according to the movement trajectory. In this state, the thickness, brightness, size, color, chroma, font, shape, or the like of the writing trajectory may be adjusted by the user's manipulation. For example, the electronic device 200 may adjust the thickness of the writing trajectory based on the tilt of the input device 100.

In this case, the electronic device 200 needs to obtain information on tilt of the input device 100. According to an embodiment, the input device 100 may generate the tilt information by itself and transmit the information to the electronic device 200.

Figure 2:
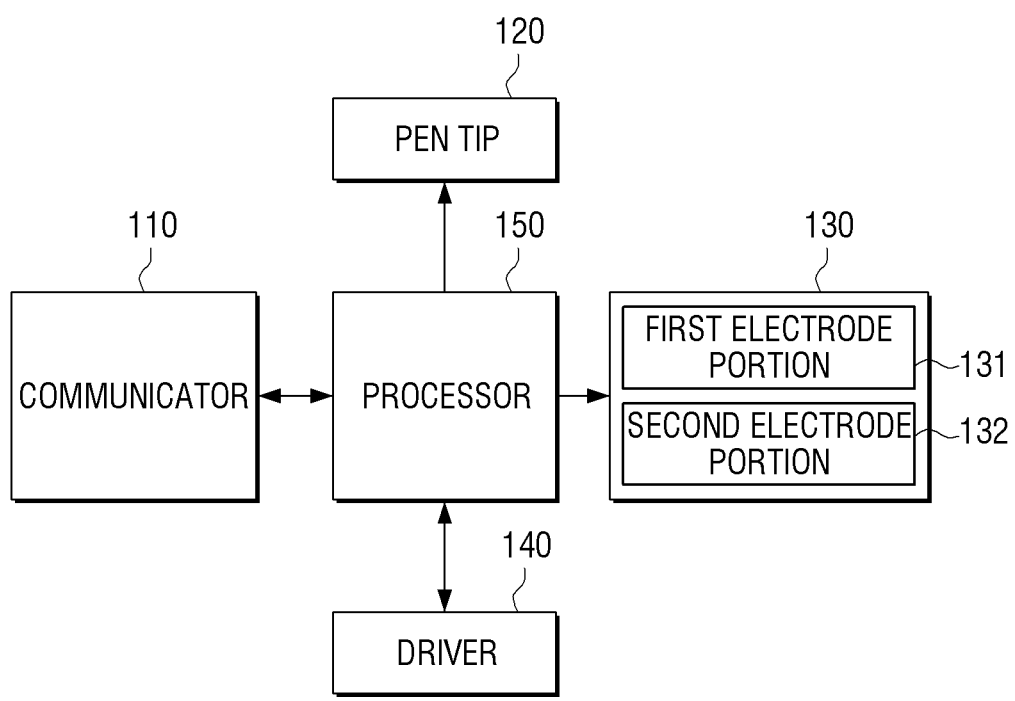
FIG. 2 is a block diagram illustrating a configuration of an input device according to an embodiment.

FIG. 2 is a block diagram illustrating a configuration of an input device according to an embodiment.

Referring to FIG. 2, the input device 100 includes a communicator 110, a pen tip 120, an electrode part 130, a driver 140, and a processor 150.

As described above, the input device 100 may be implemented as a passive method or an active method, but it will be assumed that the input device 100 is implemented as the passive method for convenience of description.

The communicator 110 performs communication with the electronic device 200. The communicator 110 may include at least one of a near field communication module, a wireless LAN communication module, and a wired Ethernet module according to the performance and structure of the input device 100. For example, the communicator 110 may be implemented as a communication module such as an infrared communication module, a Bluetooth communication module, or the like. For example, the communication module may be provided in the pen tip 120.

The pen tip 120 may be formed at one end portion of the input device 100.

Figure 3A:
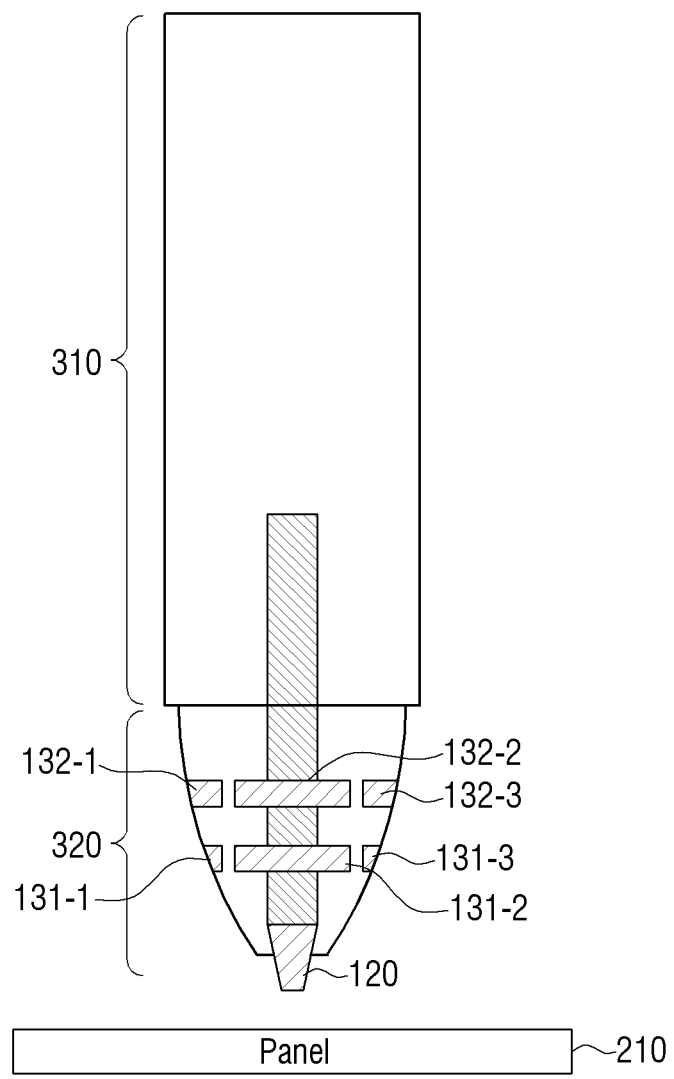
FIGS. 3A and 3B are views to describe a structure of an input device according to an embodiment.

According to one embodiment, the input device 100 may include a straight body portion 310 suitable for a user to grip as shown in FIG. 3A, and an input portion 320 which is coupled to one end thereof. For example, the input portion 320 may be implemented with a conical shape as illustrated, and the pen tip 120 may be exposed at one end. However, the body portion 310 and the input portion 320 are divided for convenience of description, and the input portion 320 may be implemented as a part of the body portion 310. That is, the input portion 320 and the body portion 310 may be implemented as a single body without distinction.

The pen tip 120 may be formed of, for example, a conductive metal tip. The conductive pen tip 120 may be formed inside a non-conductive material or may be implemented in a form in which a portion of the conductive pen tip 120 is exposed to the outside. In addition, the conductive pen tip 120 may further include an insulating material to prevent direct contact of the conductive pen tip 120 with the touch screen of the electronic device 100, in order to soften the writing feeling while using it. The insulating material may be, for example, rubber, plastic, glass, or the like.

According to one embodiment, a separate communicator 110 may not be provided, and the pen tip 120 may be implemented to perform the corresponding function. For example, the conductive pen tip 120 may serve as a transmission electrode. When the conductive pen tip 120 contacts or approaches the touch panel of the electronic device 200, the conductive pen tip 120 may be coupled with the touch panel at the contact (or hovering) point, and transmit a signal to the contact (or hovering) point of the touch panel.

The electrode portion 130 includes a first electrode portion 131 and a second electrode portion 132.

The first electrode portion 131 is formed to be spaced apart from the conductive tip 120 by a predetermined distance, and the second electrode portion 132 is formed to be spaced apart from the first electrode portion 131 by a predetermined distance. According to an embodiment, as shown in FIG. 3A, when the input portion 320 of the input device 100 is implemented in a conical shape in which a cross-sectional area gradually increases with respect to the pen tip 120, radius of the second electrode portion 132 becomes larger than the radius of the first electrode portion 132. In addition, various electrode materials may be used as the electrode portion 130, and the electrode portion 130 may be implemented as indium tin oxide (ITO), for example.

The first electrode portion 131 includes a plurality of first sub-electrodes 131-1, 131-2, and 131-3. In this case, the plurality of first sub-electrodes may be arranged to surround the input portion 320 of the input device 100 at a predetermined distance from each other as shown in FIG. 3A. Here, arrangement to surround the input portion 320 means that the first sub-electrodes 131-1, 131-2, and 131-3 are arranged at a border position of the input portion 320, and does not mean that the sub-electrodes 131-1, 131-2, and 131-3 are arranged to be exposed to the outside. That is, it will be apparent to those skilled in the art that the input portion 310 and the body portion 320 may be covered by a case.

Figure 3B:
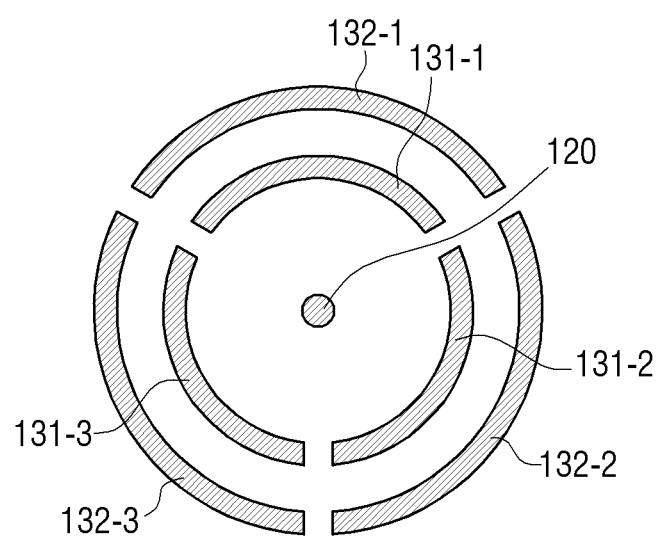

For example, the plurality of first sub-electrodes 131-1, 131-2, and 131-3 may be disposed in a format as FIG. 3B.

The second electrode portion 132 includes a plurality of second sub-electrodes 132-1, 132-2, and 132-3 which are spaced apart from the first electrode portion 131 and are arranged to correspond to each of the plurality of first sub-electrodes 131-1, 131-2, and 131-3. In this case, the plurality of second sub-electrodes may be spaced apart from the first electrode portion 131 by a predetermined distance in a direction opposite to a direction where the pen tip 120 is disposed, as illustrated in FIG. 3A, and may be arranged to surround the input portion 320 of the input device 100. For example, the plurality of the first sub-electrodes 131-1, 131-2, and 131-3 may be arranged as illustrated in FIG. 3B.

The processor 150 provides a driving signal to the first and second electrode portions 131 and 132.

According to an embodiment, the processor 150 may be implemented to include a driver (not shown). Here, the driver may be implemented as an oscillator, a bias direct current (DC) power supply, or the like. The oscillator may be implemented as a transistor circuit according to an example, and may be implemented as an LC oscillator, an RC oscillator, an oscillator using Wien Bridge, or the like. The high frequency oscillator and the low frequency oscillator may be classified according to the high and low frequency of the generated alternating current (AC) frequency, and may be classified into a sine wave oscillator, a pulse oscillator, or the like, according to the generated AC waveform. Alternatively, the driver 140 may be implemented as a bias DC power supply that does not use a transistor.

According to an embodiment, the processor 150 may be implemented as a digital signal processor (DSP), which means an integrated circuit for processing a digital signal. In this case, the driver may be implemented as a configuration of the DSP.

The processor 150 generates the title information of the input device 100 based on a plurality of capacitances formed between the plurality of first sub-electrodes 131-1 to 131-3 and the plurality of second sub-electrodes 132-1 to 132-3 corresponding to each other. In addition, the processor 150 may transmit the generated tilt information to the electronic device 200 through the communicator 110.

According to an embodiment, a plurality of first sub-electrodes may include three sub-electrodes such as electrode A, electrode B, and electrode C, and a plurality of second sub-electrodes may include three sub-electrodes such as electrode A', electrode B', and electrode C' corresponding to electrodes A, B, and C.

In this case, the electrode A and the electrode A' may operate as a first capacitor according to the first driving signal applied from the processor 150, and the electrode B and the electrode B' may operate as a second capacitor according to the second driving signal, the electrode C and the electrode C' may operate as a third capacitor according to the third driving signal. Here, the first to third driving signals may be currents of the same size.

In this case, according to the tilt of the input device 100, the capacitance formed to the first to third capacitors may change, and the processor 150 may determine the tilt of the input device 100 based thereon.

Particularly, the processor 150 may generate the tilt information by comparing a plurality of prestored reference capacitances with the plurality of calculated capacitances. Here, the plurality of reference capacitances may be capacitance formed between the plurality of first sub-electrodes 131-1 to 131-3 and a plurality of second sub-electrodes 132-1 to 132-3 respectively corresponding to the first sub-electrodes in a state where the input device 100 is at a predetermined angle with respect to the electronic device 200.

According to an example, when the same current is applied to the first to third capacitors described above, the capacitance of the first to third capacitors are the same in the state where the input device 100 is at right angles, that is 90 degrees, to the electronic device 200. In this case, the capacitance of the first to third capacitors may be the reference capacitance. However, the embodiment is not limited thereto, and it is also possible that the capacitances of the first to third capacitors becomes the reference capacitance in the state where the input device 100 is horizontal, that is, 0 degrees, with respect to the electronic device 200.

The reference capacitance value may be calculated through an experiment and prestored in the input device 100, or may be calculated based on accumulated data according to the use of the input device 100.

According to an implementation format of the input device 100, the processor 150 may be implemented not only with a digital signal processor (DSP) described above or a field programmable gate array (FPGA) format. Alternatively, the processor 150 may include one or more among a central processing unit (CPU), a micro controller unit (MCU), a controller, an application processor (AP), a communication processor (CP), and an advanced reduced instruction set computing (RISC) machine (ARM) processor or may be defined as a corresponding term.

Meanwhile, the input device 100 may include a plurality of integrators (not shown) to acquire a plurality of capacitances formed between each of the plurality of first sub-electrodes 131-1 to 131-3 and a plurality of second sub-electrodes 132-1 to 132-3 corresponding to each other, and an analog-digital converter (ADC) for converting an analog signal output from the plurality of integrators into a digital signal.

Figure 4:
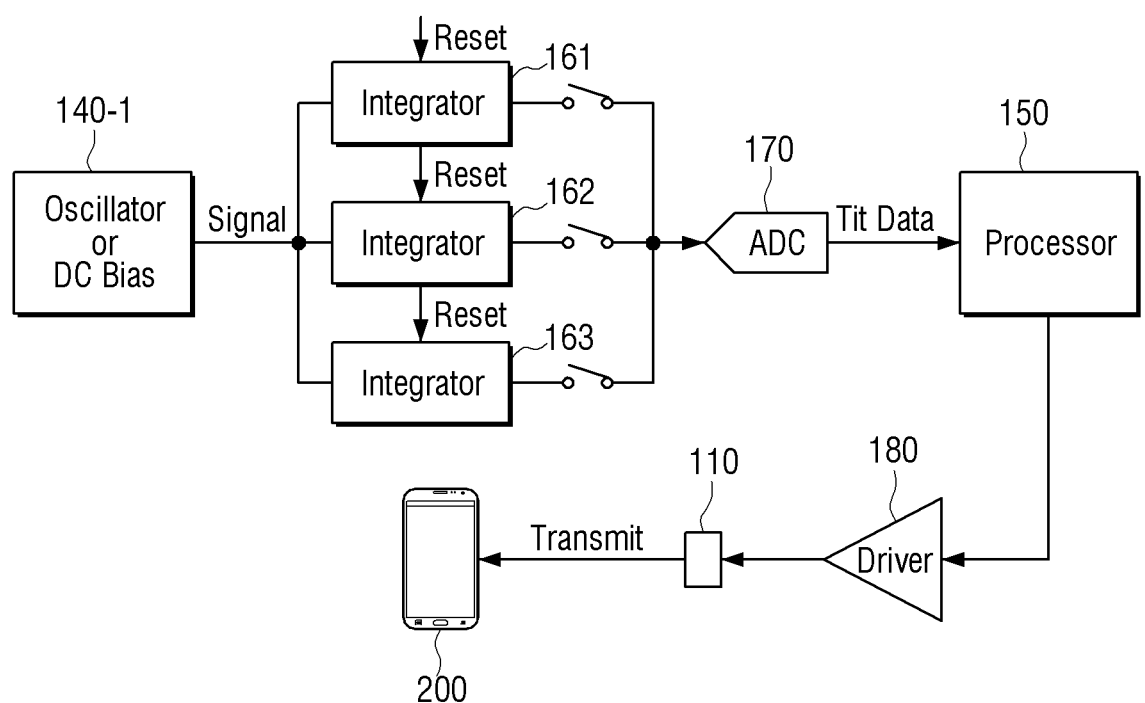
FIG. 4 is a view to describe an operation of an input device according to an embodiment.

For example, as shown in FIG. 4, each of the plurality of integrators 161, 162, and 163 may acquire a plurality of capacitances, that is, first to third capacitances, formed between the plurality of first sub-electrodes 131-1 to 131-3 and a plurality of second sub-electrodes 132-1 to 132-3 corresponding to the first sub-electrodes, and the ADC 170 may convert the plurality of capacitances to a digital signal and provide the signal to the processor 150. However, in some cases, a plurality of capacitances may be amplified through an amplifier (not shown), filtered by a filter (not shown), and provided to the ADC 170. In FIG. 4, for convenience of description, it has been illustrated that the driver 150, the plurality of integrators 161, 162, 163, the ADC 170, or the like, are the configuration separate from the processor 150. However, according to the embodiment, the driver 150, the plurality of integrators 161, 162, 163, the ADC 170, or the like, may be one configuration of the processor 150. For example, when the processor 150 is implemented as the DSP, the driver 150, the plurality of integrators 161, 162, and 163, and the ADC 170 may be one configuration of the DSP.

Here, each of the plurality of integrators 161, 162, and 163 may be implemented in a form including a resistor and an amplifier (AMP) connected to the resistor. In this case, an input of the AMP provided in each of the plurality of integrators 161, 162, and 163 may be connected to each of the plurality of first sub-electrodes 131-1 to 131-3, and the output of the AMP may be connected to each of the plurality of second sub-electrodes 132-1 to 132-3. In this case, the plurality of first sub-electrodes 131-1 to 131-3 and the plurality of second sub-electrodes 132-1 to 132-3 are paired to operate as capacitors of a plurality of integrators, respectively.

Figure 5:
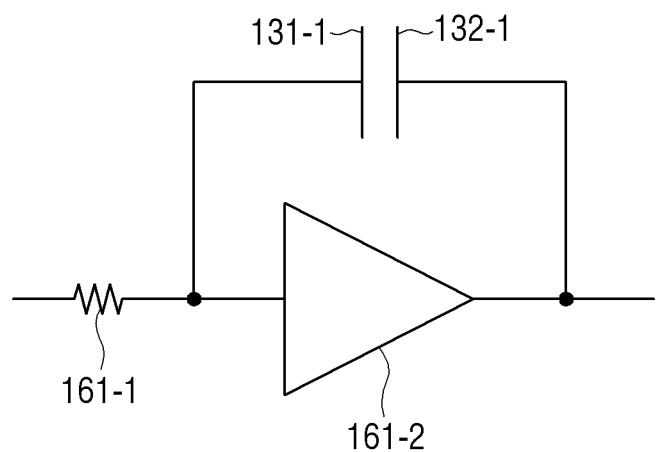
FIG. 5 is a view to describe an integrator according to an embodiment.

FIG. 5 is a view to describe an integrator according to an embodiment.

FIG. 5 illustrates the configuration of a first integrator 161 among the plurality of integrators 161, 162 and 163, in which the first integrator 161 includes a first resistor 161-1 and a first AMP 161-2, and the input of the first AMP 161-2 is connected to one of the first sub-electrodes 131-1 and the output of the AMP 161-2 is connected to one of the second sub-electrodes 132-1. In this case, the first sub-electrode 131-1 and the second sub-electrode 132-1 operate as a capacitor of the first integrator 161.

The output of the first integrator 161 may be converted to a digital signal by the ADC 170 and provided to the processor 150. By the same method, the output of the second integrator 162 and the third integrator 163 may be converted to a digital signal by the ADC 170 and provided to the processor 150.

In this case, the processor 150 may generate the tilt information of the input device 100 based on the output voltage value of each of the plurality of integrators 161, 162, and 163.

For example, the processor 150, if the output voltage values of each of the plurality of integrators 161, 162, and 163 are v1, v2, and v3, the output voltage values v1, v2, and v3 may represent charges accumulated in capacitors of each of the plurality of integrators 161, 162, and 163, that is, capacitance. This may be a capacitance between the plurality of first sub-electrodes 131-1, 131-2, and 131-3 and the plurality of second sub-electrodes 132-1, 132-2, and 132-3 corresponding thereto, and this is because when the input current i is fixed by $v=1/c * \int i \, dt$, the output voltage v changes according to the value of capacitance c.

Specifically, the processor 150 may obtain capacitance of a plurality of capacitors, based on various factors that may affect the output voltage value v, such as the magnitude of the constant current source applied to the plurality of integrators 161, 162, and 163, integration time, and output voltage values of each of the plurality of integrators 161, 162, and 163. Here, the constant current source is a power source of which internal impedance is very large (ideally infinite) and is capable of supplying current constantly regardless of the load, and the constant current source may be implemented in various forms.

According to an embodiment, the principle of generating the tilt information of the input device 100 based on a plurality of capacitances between the plurality of first sub-electrodes 131-1, 131-2, and 131-3 and the corresponding second sub-electrodes 132-1, 132-2, and 132-3 is as follows.

Figure 6A:
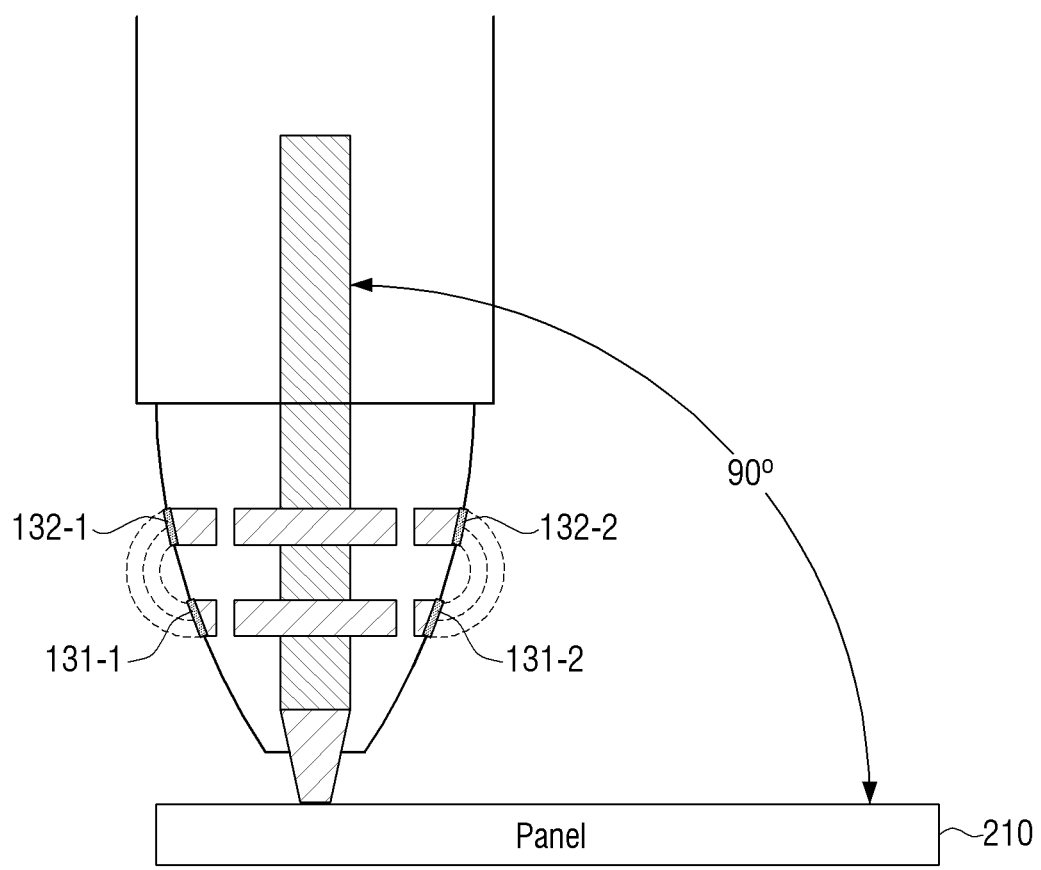
FIGS. 6A and 6B are views to describe a method for sensing a tilt according to an embodiment.
Figure 6B:
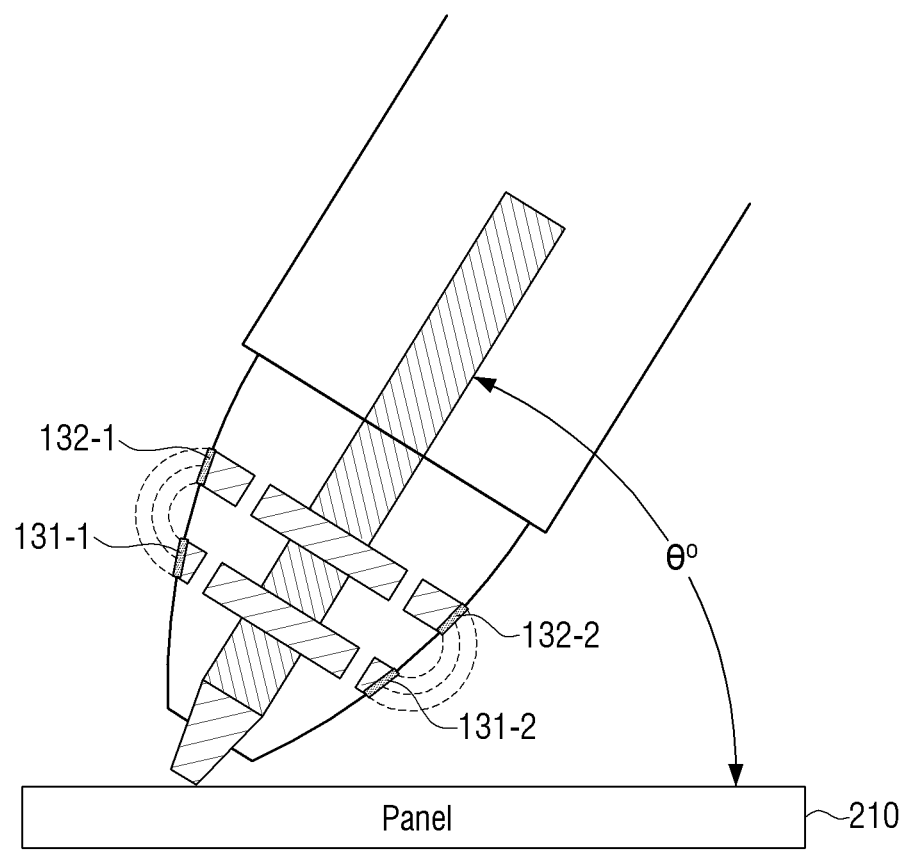

FIGS. 6A and 6B are views to describe a method for sensing a tilt according to an embodiment.

As shown in FIG. 6A, when the input device 100 stands vertically, a capacitance formed to a plurality of capacitors, for example, capacitor A by the first sub-electrode 131-1 and the second sub-electrode 132-1 and capacitor B by the second sub-electrode 131-2 and the second sub-electrode 132-1, is the same. The values of the capacitor A and capacitor B may be sensed in the corresponding first and second integrators 161 and 162, respectively, and digitally processed by the ADC 170.

The capacitance $C=\varepsilon(A/t)$ of a capacitor implemented by the first sub-electrode 131-1 and the second sub-electrode 132-1 may change according to the area of the first sub-electrode 131-1 and the second sub-electrode 132-1, the distance between the electrodes, and the dielectric constant (or relative dielectric constant). In other words, according to the degree of tilt of the input device 100, at least one of the dielectric constant of the material between the first sub-electrode 131-1 and the second sub-electrode 132-1, the distance between the electrodes, and the effective area (the area of actual capacitor function) may be different, and accordingly, the capacity changes.

For example, when the input device 100 is tilted as shown in FIG. 6B, the dielectric constant of the touch panel 210 affects the capacitance of the capacitor of the input device 100. For example, as shown in the drawing, the capacitor A by the first sub-electrode 131-1 and the second sub-electrode 132-1 is less affected by the touch panel 210, but the capacitor B by the first sub-electrode 131-2 and the second sub-electrode 132-2 is greatly changed by the influence of the touch panel 210. That is, the capacitance values of the plurality of capacitors are changed according to the tilt of the input device 100, so that the tilt of the input device 100 may be known based on the capacitance values. However, as described above, not only the dielectric constant of the inter-electrode material constituting the capacitor but also the inter-electrode distance and effective area, or the like, may be different according to the tilt, which may also affect the capacitance.

Accordingly, the processor 150 may generate the tilt information of the input device based on output voltage values v1, v2, and v3 of each of the plurality of integrators 161, 162, and 163.

The signal digitally processed through the ADC 170 may be signal processed through the processor 150, for example, the DSP, and may be transmitted to the electronic device 200 via a driver terminal 180. For example, the signal processed through the DSP may be transmitted to the electronic device 200 via the driver 180 of the pen tip 120. The tilt information of the input device 100 transmitted to the electronic device 200 may be a tilt value calculated based on the plurality of capacitance information.

However, in some cases, a signal digitally processed through the ADC 170, that is, a plurality of capacitance information may be directly transmitted to the electronic device 200 via the driver terminal 180. In the latter case, the electronic device 200 may obtain tilt information based on the plurality of capacitance information. According to an embodiment, the electronic device 200 may store tilt information corresponding to the plurality of capacitance information in the form of a lookup table. In this case, the lookup table may be obtained based on the format that the value obtained by the experiment at the time of manufacturing is prestored, and the accumulated data while the electronic device 200 is being used.

According to another embodiment, an algorithm (for example, a mathematical equation, or the like) capable of generating tilt information based on a plurality of capacitance information, or the like, may be stored. For example, the electronic device 200 may store a plurality of reference capacitance values corresponding to a reference tilt (for example, 90 degrees, 0 degrees), and may store an algorithm to obtain a tilt corresponding to the plurality of received capacitance values based on the reference tilt and the reference capacitance.

The processor 150 may generate the rotation information of the input device 100 based on a plurality of capacitances formed between the plurality of first sub-electrodes 131-1, 131-2, and 131-3 and the plurality of second sub-electrodes 132-1, 132-2, and 132-3, and transmit the information to the electronic device 200.

Here, the rotation information indicates the state of rotation with respect to a predetermined position of the input device 100, that is, in which direction the input device 100 is tilted. For example, it may be implemented that the thickness or the like of the writing trajectory varies depending on which position the input device 100 is tilted with respect to a specific reference position (for example, a position where a trademark is displayed, a position where a specific marker is provided, or the like). For example, when the input device 100 is tilted to a position having a specific marker, the writing trajectory may have the thinnest thickness and the writing trajectory may be thickened according to the degree of rotation. That is, if the input device 100 is implemented such that, when the input device 100 is tilted to a position including a specific marker, the thickness of writing trajectory is the thinnest and when the input device 100 is tilted in an opposite side, the thickness of writing trajectory is the thickest, the rotation information of the input device 100 is required.

In this case, the plurality of capacitances formed between the plurality of first sub-electrodes 131-1, 131-2, and 131-3 and the plurality of second sub-electrodes 132-1, 132-2, and 132-3 disposed at different positions may provide information on how much the input device 100 is titled and rotated with respect to a preset position.

The processed tilt information and rotation information may be converted to data for transmission through the driver 180 and transmitted to the electronic device 200.

In the embodiment above, it has been described that the first electrode portion 131 and the second electrode portion 132 include three sub-electrodes, respectively, but this is merely exemplary and the number of sub-electrodes is not limited thereto.

In the embodiment above, it is assumed that ECR method is implemented, but in the case of other method, the same principle may be applied to the various embodiments.

Figure 7:
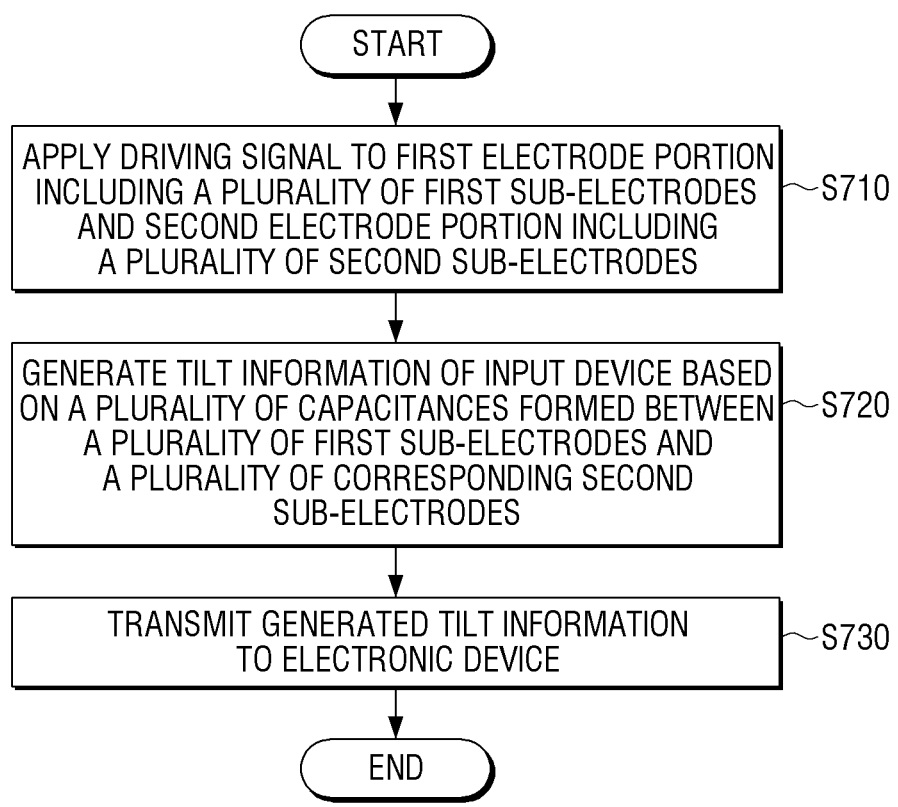
FIG. 7 is a flowchart to describe a controlling method of an input device according to an embodiment.

FIG. 7 is a flowchart to describe a controlling method of an input device according to an embodiment.

The input device to which the controlling method according to FIG. 7 is applied may include a pen tip provided in the input device, a first electrode portion including a plurality of first sub-electrodes spaced apart from each other at a predetermined distance from the pen tip, the second electrode portion including a plurality of second sub-electrodes spaced apart from each other to correspond to the plurality of first sub-electrodes at positions spaced apart from the first electrode by a predetermined distance.

A driving signal is applied to at least one of the plurality of first sub-electrodes included in the first electrode portion and the plurality of second sub-electrodes included in the second electrode portion in step S710. Here, each of the plurality of second sub-electrodes may correspond to each of the plurality of first sub-electrodes.

The tilt information of the input device is generated based on the plurality of capacitances formed between each of the plurality of first sub-electrodes and the corresponding plurality of second sub-electrodes in step S720.

In this case, one of the plurality of first sub-electrodes and the corresponding second sub-electrode from among the plurality of second sub-electrodes may operate as the first capacitor according to the first driving signal, and the other of the plurality of first sub-electrodes and the corresponding second sub-electrode among the plurality of second sub-electrodes may operate as the second capacitor according to the second driving signal, and the plurality of capacitances, the capacitance of the first capacitor, and the capacitance of the second capacitor may be included.

Thereafter, the generated tilt information is transmitted to the electronic device in step S730.

The plurality of first sub-electrodes may be arranged to be spaced apart from each other by a predetermined distance to surround the input portion. In addition, the plurality of second sub-electrodes may be spaced apart from the first electrode unit by a predetermined distance to surround the input portion.

Alternatively, the input device may further include a plurality of integrators each including a resistor and the AMP connected to the resistor as described above. In this case, an input of the AMP is connected to each of the plurality of first sub-electrodes, an output of the AMP is connected to each of the plurality of second sub-electrodes, and the plurality of first sub-electrodes and the plurality of second sub-electrodes may be paired respectively, and operate as a capacitor of each of the plurality of integrators.

In operation S720 of generating the tilt information of the input device, capacitances of the plurality of capacitors may be obtained based on the magnitudes of the constant current sources applied to the plurality of integrators, the integration time, and the output voltage values of each of the plurality of integrators.

In step S720 of generating the tilt information of the input device, the tilt information may be generated by comparing a plurality of reference capacitances with a plurality of capacitances. Here, the plurality of reference capacitances may be capacitances formed between the plurality of first sub-electrodes and the plurality of second sub-electrodes measured while the input device is at a predetermined angle with respect to the electronic device.

The tilt information of the input device may be at least one of the plurality of capacitance information and a tilt value calculated based on the plurality of capacitance information.

The controlling method may further include generating rotation information of the input device based on the plurality of capacitances formed between the plurality of first sub-electrodes and the plurality of second sub-electrodes and transmitting the generated rotation information to the electronic device.

According to various embodiments, a tilt may be sensed by recognizing a change in a capacity value of an input device itself, designing independent of an electronic device is available.

The tilt information may be transmitted to the electronic device through one transmitter, power consumption may be reduced.

The methods according to various embodiments may be implemented as a format of software or application installable to a related art electronic apparatus.

The methods according to various embodiments may be implemented by software upgrade of a related art electronic apparatus, or hardware upgrade only.

A non-transitory computer readable medium which stores a program for sequentially executing a method for controlling according to an embodiment may be provided.

The non-transitory computer-recordable medium is not a medium configured to temporarily store data such as a register, a cache, or a memory but an apparatus-readable medium configured to semi-permanently store data. Specifically, the non-transitory apparatus-readable medium may be a compact disc (CD), a digital versatile disc (DVD), a hard disc, a Blu-ray disc, a universal serial bus (USB), a memory card, a read only memory (ROM), and the like.

While one or more embodiments have been described with reference to the figures, it will be understood by those of ordinary skill in the art that various changes in form and details may be made therein without departing from the spirit and scope as defined by the following claims and their equivalents.

What is claimed is:

1. An input device comprising:
a communicator configured to communicate with an electronic device;
a pen tip provided at one end of the input device;
a first electrode portion including a plurality of first sub-electrodes spaced apart from each other by a predetermined distance from the pen tip;
a second electrode portion including a plurality of second sub-electrodes spaced apart from each other to correspond to each of the plurality of first sub-electrodes at a position spaced apart from the first electrode portion by a predetermined distance; and
a processor configured to:
provide a driving signal to the first electrode portion and the second electrode portion, generate tilt information of the input device by comparing a plurality of reference capacitances and a plurality of capacitances formed between the plurality of first sub-electrodes and the plurality of second sub-electrodes, and transmit the tilt information to the electronic device,
wherein the plurality of reference capacitances are capacitances formed between the plurality of first sub-electrodes and the plurality of second sub-electrodes and measured in a state where the input device is at a predetermined angle with respect to the electronic device.

2. The input device of claim 1, wherein:
one of the plurality of first sub-electrodes and a corresponding second sub-electrode among the plurality of second sub-electrodes operates as a first capacitor according to a first driving signal,
another one of the plurality of first sub-electrodes and a corresponding second sub-electrode among the plurality of second sub-electrodes operates as a second capacitor according to a second driving signal, and
the plurality of capacitances comprise capacitance of the first capacitor and capacitance of the second capacitor.

3. The input device of claim 1, wherein the plurality of first sub-electrodes are spaced apart from each other by a predetermined distance and disposed to surround the input device, and
wherein the plurality of second sub-electrodes are spaced apart from the first electrode portion by a predetermined distance in a direction opposite to a direction where the pen tip is disposed, and disposed to surround the input device.

4. The input device of claim 1, wherein the processor comprises:
a driver configured to apply a driving signal to the electrode portion; and
a plurality of integrators each including a resistor and an amplifier (AMP) connected to the resistor, and
wherein input of each AMP is connected to a respective first sub-electrode and output of each AMP is connected to a respective second sub-electrode, and
wherein each of the plurality of first sub-electrodes and each of the plurality of second sub-electrodes are paired respectively and operate as a respective capacitor of each of the plurality of integrators.

5. The input device of claim 4, wherein the processor is configured to obtain each of the plurality of capacitances of each of a plurality of capacitors on the basis of a magnitude of constant current source applied to the plurality of integrators, integration time, and an output voltage value of each of the plurality of integrators.

6. The input device of claim 1, wherein the tilt information of the input device is at least one of information on the plurality of capacitances or a tilt value calculated on the basis of the plurality of capacitances.

7. The input device of claim 1, wherein the processor is configured to generate rotation information of the input device on the basis of a plurality of capacitances formed between the plurality of first sub-electrodes and the plurality of second sub-electrodes and transmit the rotation information to the electronic device.

8. An electronic system including an electronic device having an input device and a touch screen, wherein:
the input device includes a pen tip provided at one end of the input device, a first electrode portion including a plurality of first sub-electrodes spaced apart from each other by a predetermined distance from the pen tip, and a second electrode portion including a plurality of second sub-electrodes spaced apart from each other to correspond to each of the plurality of first sub-electrodes at a position spaced apart from the first electrode portion by a predetermined distance from the first electrode portion, wherein a plurality of capacitances formed between the plurality of first sub-electrodes and the plurality of second sub-electrodes is transmitted to the electronic device; and
the electronic device is configured to obtain a tilt value of the input device by comparing a plurality of reference capacitances and the plurality of capacitances received from the input device, and control the touch screen on the basis of the obtained tilt value, wherein the plurality of reference capacitances are capacitances formed between the plurality of first sub-electrodes and the plurality of second sub-electrodes and measured in a state where the input device is at a predetermined angle with respect to the electronic device.

9. A controlling method of an input device including a pen tip provided at one end, a first electrode portion including a plurality of first sub-electrodes spaced apart from each other by a predetermined distance from the pen tip, and a second electrode portion including a plurality of second sub-electrodes spaced apart from each other to correspond to each of the plurality of first sub-electrodes at a position spaced apart from the first electrode portion by a predetermined distance from the first electrode portion, the method comprising:

providing a driving signal to the first electrode portion and the second electrode portion;

generating tilt information of the input device by comparing a plurality of reference capacitances and a plurality of capacitances formed between the plurality of first sub-electrodes and the plurality of second sub-electrodes; and transmitting the tilt information to an electronic device, wherein the plurality of reference capacitances are capacitances formed between the plurality of first sub-electrodes and the plurality of second sub-electrodes and measured in a state where the input device is at a predetermined angle with respect to the electronic device.

10. The controlling method of claim 9, wherein:

one of the plurality of first sub-electrodes and a corresponding second sub-electrode among the plurality of second sub-electrodes operates as a first capacitor according to a first driving signal, another one of the plurality of first sub-electrodes and a corresponding second sub-electrode among the plurality of second sub-electrodes operates as a second capacitor according to a second driving signal, and the plurality of capacitances comprise capacitance of the first capacitor and capacitance of the second capacitor.

11. The controlling method of claim 9, wherein the input device comprises a plurality of integrators each including a resistance and an amplifier (AMP) connected to the resistance, and wherein each of the plurality of first sub-electrodes and each of the plurality of second sub-electrodes are paired respectively and are operated as a respective capacitor of each of the plurality of integrators.

12. The controlling method of claim 11, wherein the generating tilt information of the input device comprises obtaining each of the plurality of capacitances of each of a plurality of capacitors on the basis of a magnitude of constant current source applied to the plurality of integrators, integration time, and an output voltage value of each of the plurality of integrators.

* * * * *